United States Patent [19]
Thielen

[11] 3,850,533
[45] Nov. 26, 1974

[54] POSITIONAL UNIVERSAL JOINT

[75] Inventor: James E. Thielen, New Brighton, Minn.

[73] Assignee: Minnesota Mining and Manufacturing Company, St. Paul, Minn.

[22] Filed: May 31, 1973

[21] Appl. No.: 365,753

Related U.S. Application Data

[60] Division of Ser. No. 269,415, July 6, 1972, , which is a continuation-in-part of Ser. No. 79,212, Oct. 8, 1970, abandoned.

[52] U.S. Cl. ................. 403/58, 64/17 SP, 403/154, 403/157
[51] Int. Cl. ............................................. F16d 3/28
[58] Field of Search ....... 15/144 A; 64/17 R, 17 SP; 16/140; 403/145, 146, 154, 157, 58

[56] References Cited
UNITED STATES PATENTS

| | | | |
|---|---|---|---|
| 2,400,658 | 5/1946 | Shepherd | 285/DIG. 19 |
| 2,607,949 | 8/1952 | Lyon | 16/140 |
| 2,636,759 | 4/1953 | Rueb | 64/17 SP X |
| 2,833,130 | 5/1958 | Sanderson | 64/17 R |
| 2,847,238 | 8/1958 | Bolling | 403/154 |
| 2,943,868 | 7/1960 | Hanback | 285/DIG. 19 |

*Primary Examiner*—Daniel Blum
*Attorney, Agent, or Firm*—Alexander, Sell, Steldt and DeLaHunt

[57] ABSTRACT

A mop frame assembly having an improved universal joint which permits universal positioning of the handle and frame. The universal joint is formed of a pair of bifurcate holding members and a connecting member that are held together by locking plugs. Each locking plug has a resilient friction ring adapted to provide resistance to pivotal movement of the holding members and the connecting member.

3 Claims, 5 Drawing Figures

PATENTED NOV 26 1974　　　　　　　　　　　　　　　　3,850,533
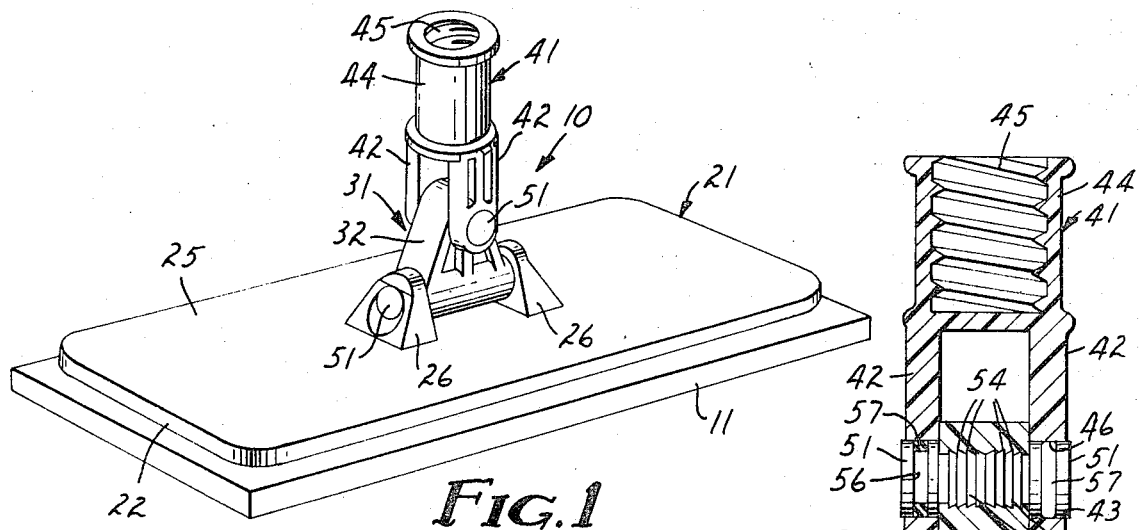
FIG.1
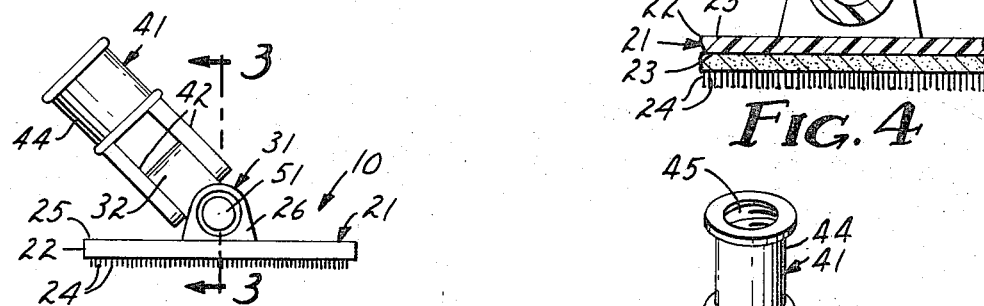
FIG.2
FIG.4
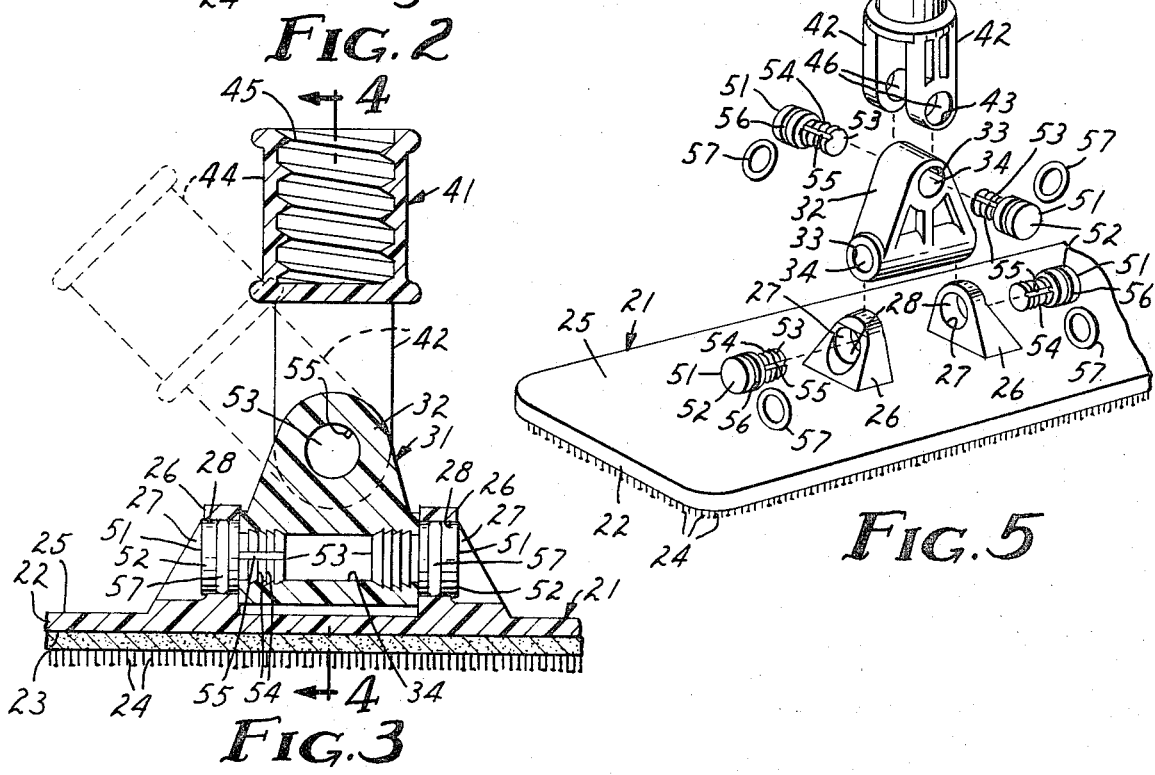
FIG.3
FIG.5

POSITIONAL UNIVERSAL JOINT

This a division of application Ser. No. 269,415 filed July 6, 1972, now U.S. Pat. No. 3,778,860, which application is a continuation-in-part of Ser. No. 79,212, filed Oct. 8, 1970, now abandoned.

BACKGROUND OF THE INVENTION

The invention relates to a positional universal joint.

Universal joints have been known for some time, as exemplified by the several types described in U.S. Pat. Nos. 927,087; 2,251,126; 2,260,567; and 3,431,751. Mops having the handle attached to the frame by means of swivel connectors are disclosed in U.S. Pat. Nos. 2,973,540; 3,174,172; 3,360,286.

Most previously available mop frames utilize a swivel connector having a manually adjustable screw device to permit positioning of the handle and mop frame at a desired angle and maintaining the angle until a different one is desired. It is inconvenient and ineffecient to stop, manually loosen, and retighten a screw device to reposition the handle with respect to the frame. Alternatively, the swivel connector is of a construction such that the handle and frame are freely movable with respect to each other and hence the handle and frame cannot be maintained in a fixed position during use of the mop. Removal of such a mop from the surface being cleaned causes it to flop loosely and assume undesired positions.

In still another alternative, disclosed in U.S. Pat. No. 3,012,264, fiber-filled nylon washers are interposed between the surfaces of a connecting link and ears to which a mop base and socket are attached. Although such an arrangement may at first permit the base to be maintained in fixed position after positioning, it is inherently subject to loosening as the surface of the nylon washer is worn and as the joint is stressed in use.

SUMMARY

The invention provides a mop frame having an improved connector for attaching mop handles to mop frames. The handle and frame may be securely positioned with respect to each other without adjusting a screw device and the position maintained during use of the mop. An operator may place the handle and frame in a pre-selected position to effectively clean a given surface, and when he desires, readily manually reposition the frame and handle without loosening or tightening screws, bolts, or other type of fastener.

BRIEF DESCRIPTION OF THE DRAWING

Understanding of the invention will be facilitated by referring to the accompanying drawing, in which like numbers refer to like parts in the several views and in which:

FIG. 1 is a perspective vew of a mop frame embodying the principles of the invention;

FIG. 2 is a side view of the device of FIG. 1 with the pad removed;

FIG. 3 is a cross-sectional view of the device of FIG. 2 taken along section line 3—3 with the handle holder in upright position;

FIG. 4 is a cross-sectional view of the device of FIG. 3, taken along section line 4—4;

FIG. 5 is a view of the device of FIG. 1 with the component parts disconnected for ease of display and explanation.

Mop frame assembly 10, in total, is best shown in FIG. 1, while structural details are illustrated primarily in FIGS. 2 through 5.

DESCRIPTION OF THE PREFERRED EMBODIMENT

The embodiment shown and described in the drawing is preferred for attaching a mop handle to a mop frame which is particularly adapted for gripping low density fibrous pads such as those disclosed in U.S. Pat. No. 2,958,593.

Mop assembly 10 comprises frame 21, universal joint 31, and handle holder 41. FIG. 1 shows a low density fibrous scouring pad 11 attached to frame 21 in position for cleaning or polishing surfaces.

Frame 21 comprises a base portion 22 which may be of any desired configuration suitable for the intended purpose of the mop, e.g., square, rectangular, elliptical, circular, etc. Lower surface 23 of base 22 has a plurality of downwardly extending headed and non-headed fibers 24 securely adhesively attached thereto. Fibers 24 comprise a means of attaching pad 11 to base 22 and are disclosed and claimed in U.S. Pat. No. 3,527,001. Fibers 24 intermesh and intertangle with the fibers of pad 11 to securely releaseably attach it to base 10. If desired, base 22 may be adapted to grip such other cleaning implements such as sponges, string dust mops, or items commonly used in maintaining surfaces such as floors, truck trailers, airplanes, walls, windows, etc. Base 22 may be of a rigid material for cleaning flat surfaces or of a flexible material when it is desired to clean curved surfaces.

Upper surface 25 of base 22 has thereon a pair of holding members 26, with axially aligned openings 27 therethrough, which are an integral part of universal joint 31 about to be described. If desired, holding members 26 may be recessed in a depression in upper surface 25 of base 22, be attached to base 22 by rivets or adhesive, or molded as an integral portion thereof. Attached to holding members 26 is connecting member 32 which has two bores 33 therethrough, the axes of said bores 33 being at right angles to each other.

Handle holder 41 comprises arms 42 having axially aligned circular openings 43 therethrough. The upper end of handle holder 41 comprises socket 44 having internal threads 45 for attaching an externally complementarily threaded mop handle (not shown). If desired, socket 44 can be replaced with any available type of handle holding means. One of the bores 33 is positioned between holding members 26, the other bore 33 being positioned between openings 43 of arms 42.

Holding members 26, connecting member 32, and holder 41 are securely attached to each other by means of plugs 51 which comprise head portion 52 and shank portion 53. Head 52 is slightly smaller in diameter than openings 27 and 43, and the diameter of shank 53 is about the same as the diameter of bores 33 to create a tight friction fit when shank 53 is inserted in bore 33. Shank 53 has annular ribs 54 to assist in securely retaining plugs 51 in bores 33 when shank 53 is inserted therein, and has groove 55 to permit escape of air when plug 51 is inserted in bore 33. Head portion 52 of plug 51 has annular groove 56 thereon to support a rubber friction ring such as O-ring 57. Rubber O-ring 57 has an inner circumference about the same as that seated therein, the thickness of O-ring 57 and the depth of groove 56 being such that part of O-ring 57 extends beyond head 52. O-ring 57 frictionally engages smooth inner walls 28 of opening 27 in base 22 and smooth inner walls 46 of opening 43 in arms 42, the friction fit providing universal joint 31 with a freedom of movement which permits manual adjustment to various positions, the friction fit retaining the preselected position during use of the mop. If desired to permanently secure plugs 51 in place, their opposing ends may be adhered to each other or joined by other connecting means such as wires, etc.

The mop frame assembly is made from materials which provide resistance to the environment in which the mop is to be used, as well as structural strength. Preferably, base 21, connecting member 32, and handle holder 41 are constructed of acrylonitrile-butadiene-styrene copolymer but may be of polyacetal, nylon, metal, etc. Plugs 51 are preferably constructed of glass fiber filled nylon or brass but may be of the same materials used for base 21. O-rings 57 are preferably of a butadiene-acrylonitrile rubber copolymer having a durometer of about 70 to provide long life as well as good oil and water resistance.

A preferred embodiment of this invention having been described and illustrated, it is to be realized that modifications thereof may be made without departing from the broad spirit and scope of this invention as defined in the appended claims.

I claim:

1. A positionable universal joint comprising:
   a. a pair of bifurcate holding members each arm of which has an opening therethrough, each opening having a smooth wall, the plane of the openings of a complementary pair of arms being substantially parallel and axially aligned;
   b. a connecting member having a pair of spaced bores therethrough, each bore being aligned with one said axially aligned pair of openings in said holding member arms;
   c. a plurality of locking plugs securing said holding members and said connecting member in cooperative complementary pivotal positionable relationship, each said locking plug having a shank and a head portion, the shank portion of a locking plug extending into one end of a bore to create a tight friction fit with said connecting member and the head portion thereof being circumferentially grooved and extending into an opening in a holding member, and
   d. a compressible resilient friction ring supported in said groove of each of said locking plugs, each said friction ring having an outer diameter slightly larger than the diameter of the opening receiving it and an inner circumference about the same as that of the groove which supports it, whereby insertion of the head portion into its opening compresses the ring to provide frictional resistance to pivotal movement of said holding members and said connecting member.

2. Joint of claim 1 wherein the resilient friction ring of said plugs is a rubber O-ring.

3. Joint of claim 2 wherein the axes of said bores are at right angles to each other.

* * * * *